US011108673B2

(12) United States Patent
Kludy et al.

(10) Patent No.: US 11,108,673 B2
(45) Date of Patent: Aug. 31, 2021

(54) EXTENSIBLE, DECENTRALIZED HEALTH CHECKING OF CLOUD SERVICE COMPONENTS AND CAPABILITIES

(71) Applicant: Citrix Systems, Inc., Fort Lauderdale, FL (US)

(72) Inventors: Thomas Kludy, Fort Lauderdale, FL (US); Ricardo Feijoo, Fort Lauderdale, FL (US); Ayush Jain, North Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 159 days.

(21) Appl. No.: 15/707,077

(22) Filed: Sep. 18, 2017

(65) Prior Publication Data

US 2019/0089618 A1    Mar. 21, 2019

(51) Int. Cl.
  *H04L 12/26*    (2006.01)
  *G06F 11/30*    (2006.01)
  *H04L 29/08*    (2006.01)

(52) U.S. Cl.
  CPC ............... *H04L 43/50* (2013.01); *G06F 11/30* (2013.01); *H04L 43/04* (2013.01); *H04L 43/0817* (2013.01); *H04L 43/12* (2013.01); *H04L 67/10* (2013.01); *H04L 67/34* (2013.01)

(58) Field of Classification Search
  None
  See application file for complete search history.

(56) References Cited

U.S. PATENT DOCUMENTS

| 9,992,086 | B1* | 6/2018 | Mizik | H04L 43/0817 |
| 2005/0130675 | A1* | 6/2005 | Burch | H04L 43/12 |
| | | | | 455/456.5 |
| 2006/0020705 | A1* | 1/2006 | Paek | H04L 69/16 |
| | | | | 709/228 |
| 2011/0270966 | A1* | 11/2011 | Zhou | H04L 41/0213 |
| | | | | 709/224 |
| 2012/0271937 | A1* | 10/2012 | Cotten | G06Q 10/10 |
| | | | | 709/224 |
| 2015/0350087 | A1* | 12/2015 | Hong | H04L 67/1023 |
| 2017/0104846 | A1* | 4/2017 | Vulich | H04L 67/1027 |
| 2017/0124193 | A1* | 5/2017 | Li | H04L 63/101 |

* cited by examiner

*Primary Examiner* — Aaron N Strange
*Assistant Examiner* — Mohammad Yousuf A. Mian
(74) *Attorney, Agent, or Firm* — Banner & Witcoff, Ltd.

(57) ABSTRACT

Methods, computer-readable media, and apparatuses for checking the health of a cloud-based component. The method includes receiving, by a health event hub as output by a first device, a request for performing a health check on a second device; outputting, by the health event hub, the request to each health checker on the network; receiving, by the health event hub, a health data response output by at least one checker that is capable of performing the health check; collecting, by the health event hub, each health data response associated with the request output by the first device that is output by the at least one health checker that is capable of performing the health check on the second device; and outputting, by the health event hub to each health data collector on the network, each health data response associated with the request output by the first device.

20 Claims, 11 Drawing Sheets

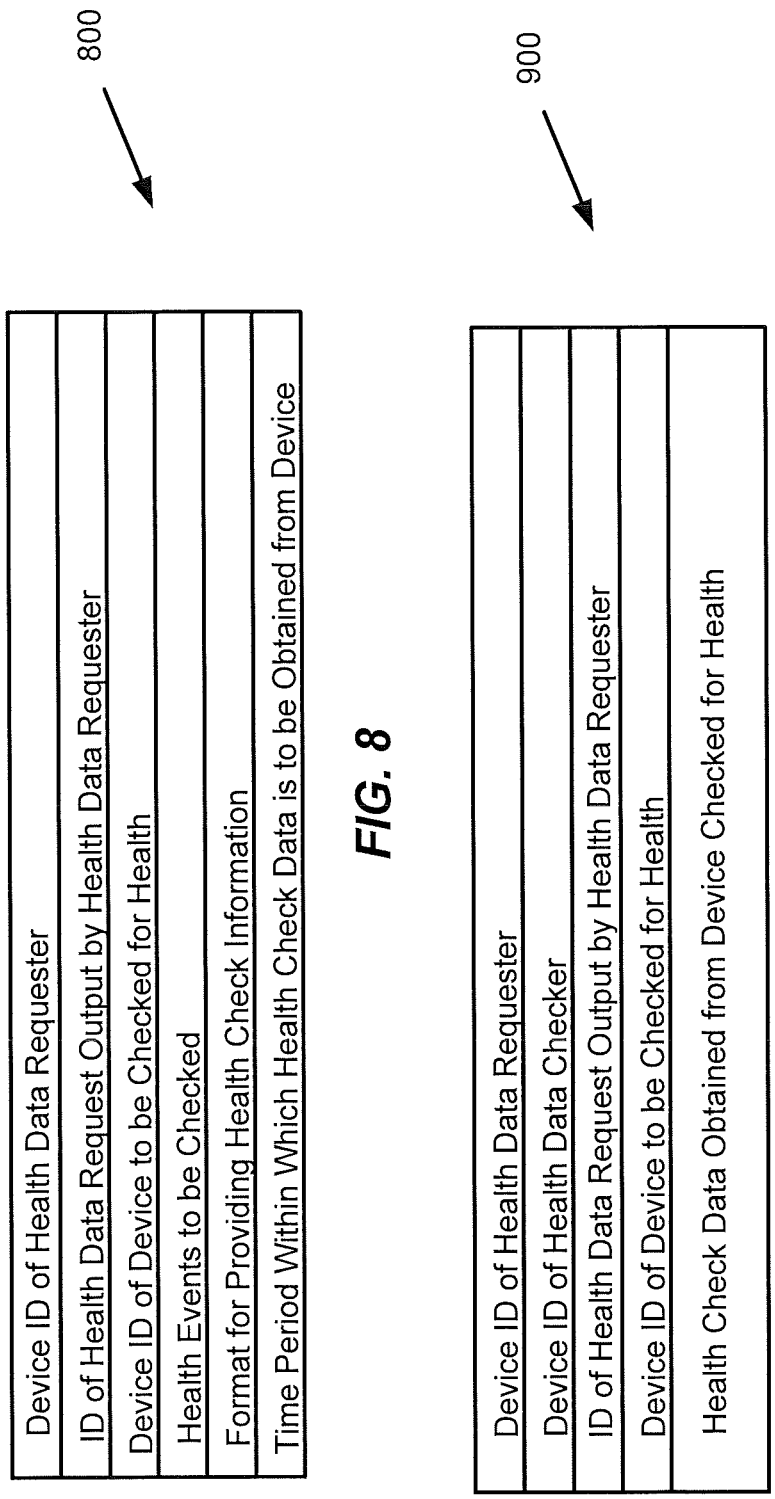

FIG. 10 — 1000

- Device ID of Health Data Requester
- Device ID of Health Data Checker
- ID of Health Data Request Output by Health Data Requester for Which Data is being Provided
- Device ID of Device to be Checked for Health
- Health Check Data Obtained from Device Checked for Health

FIG. 11 — 1100

- Device ID of Health Data Requester
- Device ID of Health Data Checker
- Device ID of Device to be Checked for Health
- ID of Health Data Request Output by Health Data Requester
- CPU Utilization: 55% During Health Check Request Time Period
- Memory Utilization: 25% Free Disk Space Available

EXTENSIBLE, DECENTRALIZED HEALTH CHECKING OF CLOUD SERVICE COMPONENTS AND CAPABILITIES

FIELD

Aspects of the disclosure relate to computer hardware and software. In particular, one or more aspects of the disclosure generally relate to computer hardware and software for providing extensible, decentralized health checking of cloud service components and capabilities, such as health checking of a server used for cloud-based data processing and data storage.

BACKGROUND

Cloud-based services are becoming more and more important, due to ready access to the cloud by users who can access a cloud system using various computing devices (e.g., mobile phone, tablet, personal computer) at various locations. For example, CITRIX CLOUD (by Citrix Systems of Fort Lauderdale, Fla.) offers a simple, flexible way to deliver applications, desktops, and data, to users wherever the users may be.

Incumbent with cloud-based services is the need to periodically check on the health of those cloud-based services. For example, a processor that serves as a virtual machine for a user computer may be accessible via the Internet, and the utilization of the processor's resources may be checked periodically, such as every minute, to determine whether the processor is available to handle requests made by users to a cloud. Also, a user requesting access to a particular application, such as a Microsoft WORD application, may access that application via a virtual connection to a cloud-based processor, whereby the current utilization of that processor, as well as other cloud-based processors of a cloud-based service, may be obtained to determine which one of the cloud-based processors is to be assigned by the cloud to handle the request by the user to access the Microsoft WORD application.

In conventional cloud-based health monitoring systems, a single service is provided for gathering health metrics of cloud-based components. That single service operates as a centralized health monitoring service that all devices seeking health-related information of cloud-based components must access via a network connection.

Further, in conventional cloud-based health monitoring systems, the centralized health monitoring service obtains information beforehand regarding all sources of health metrics, and the centralized health monitoring service integrates directly with those sources of health metrics. For example, a first source of health metrics may provide a first set of health metrics regarding a computer system memory (e.g., what percentage of a hard drive space accessible by a computer is currently being used, how much of a Random Access Memory of the computer is currently being used to execute an application, etc.). A second source of health metrics may provide a second set of health metrics regarding a computer system processor (e.g., how fast a computer processor is currently running with respect to a maximum processor speed, how many cores of a multi-core processor are currently being used for running one or more applications, etc.).

With the above scheme, the centralized health monitoring service needs to know all of the capabilities of each of the plural sources of health metrics, in order for the centralized health monitoring service to effectively communicate with the plural sources of health metrics. Further, when a new source of health metrics is added to the system, a code and/or configuration change is required to the centralized health monitoring service, to enable the centralized health monitoring service to be able to communicate with the new source of health metrics and to determine its capabilities (e.g., what types of health metrics does the new source of health metrics perform).

Furthermore, in conventional cloud-based health monitoring systems, a centralized health gathering service is responsible for receiving all of the health metric responses, storing those responses, performing analytics on the responses, and taking corrective actions if necessary. In such conventional cloud-based health monitoring systems, if a new action needs to be performed based on health checks, this typically requires updates to software and/or configuration changes by the centralized health gathering service.

SUMMARY

Aspects of the disclosure relate to various systems and techniques that provide for a decentralized health check request/health check response for components communicatively connected to each other via a network, such as for checking health of components making up a cloud-based service.

At least one aspect described herein addresses a need to provide a health checking system or process for enabling any device to operate as a health check requester, for requesting a health check to be performed on a target device.

At least one aspect described herein addresses a need to provide a health checking system or process for enabling a health check requester to output a health check request that does not specify a particular health checker to perform the health check.

At least one aspect described herein addresses a need to provide a distributed health checking system or process in which plural health check requesters, plural health checkers, and plural receiver/data collectors are disposed, in which a health check request output by a health check requester may be processed by one or more of the plural health checkers, and in which health response information output by the one or more of the plural health checkers are collected and formatted for output to a user by one or more of the receiver/data collectors.

At least one embodiment is directed to a method for checking the health of a cloud-based component. The method includes outputting, by a first device on a network, a request for performing a health check on a second device on the network. The method further includes receiving, by a health event hub, the request and outputting the request to each of a plurality of health checkers on the network. The method also includes determining, by each of the plurality of health checkers, whether the respective health checker is capable of performing the health check on the second device. The method further includes performing, for each of the plurality of health checkers that are capable of performing the health check on the second device, a health check. The method still further includes outputting, to the health event hub, by each of the plurality of health checkers that are capable of performing the health check on the second device, a health data response. The method also includes collecting, by the health event hub, each health data response associated with the request output by the first device that are output by each of the plurality of health checker that are capable of performing the health check on the second device. The method further includes outputting, by the health event hub to each of a plurality of health data collectors on the network, each health data response associated with the request output by the first device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 8 depicts an example of a data structure of a health data request received by an event hub as output by a health data requester, in accordance with one or more illustrative aspects described herein.

FIG. 9 depicts an example of a data structure of a health data response received by an event hub as output by a health data checker, in accordance with one or more illustrative aspects described herein.

FIG. 10 depicts an example of a data structure of a health data response that has been correlated with a health data request, in accordance with one or more illustrative aspects described herein FIG. 11 depicts an example of a data structure of a health data collection report as output by a health data collector, in accordance with one or more illustrative aspects described herein.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be used, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing for extensible, decentralized health checking of cloud service components and capabilities. Before discussing these concepts in greater detail, however, several examples of computing architecture and enterprise mobility management architecture that may be used in implementing and/or otherwise providing various aspects of the disclosure will first be discussed with respect to FIGS. 1-4.

Figure 1:
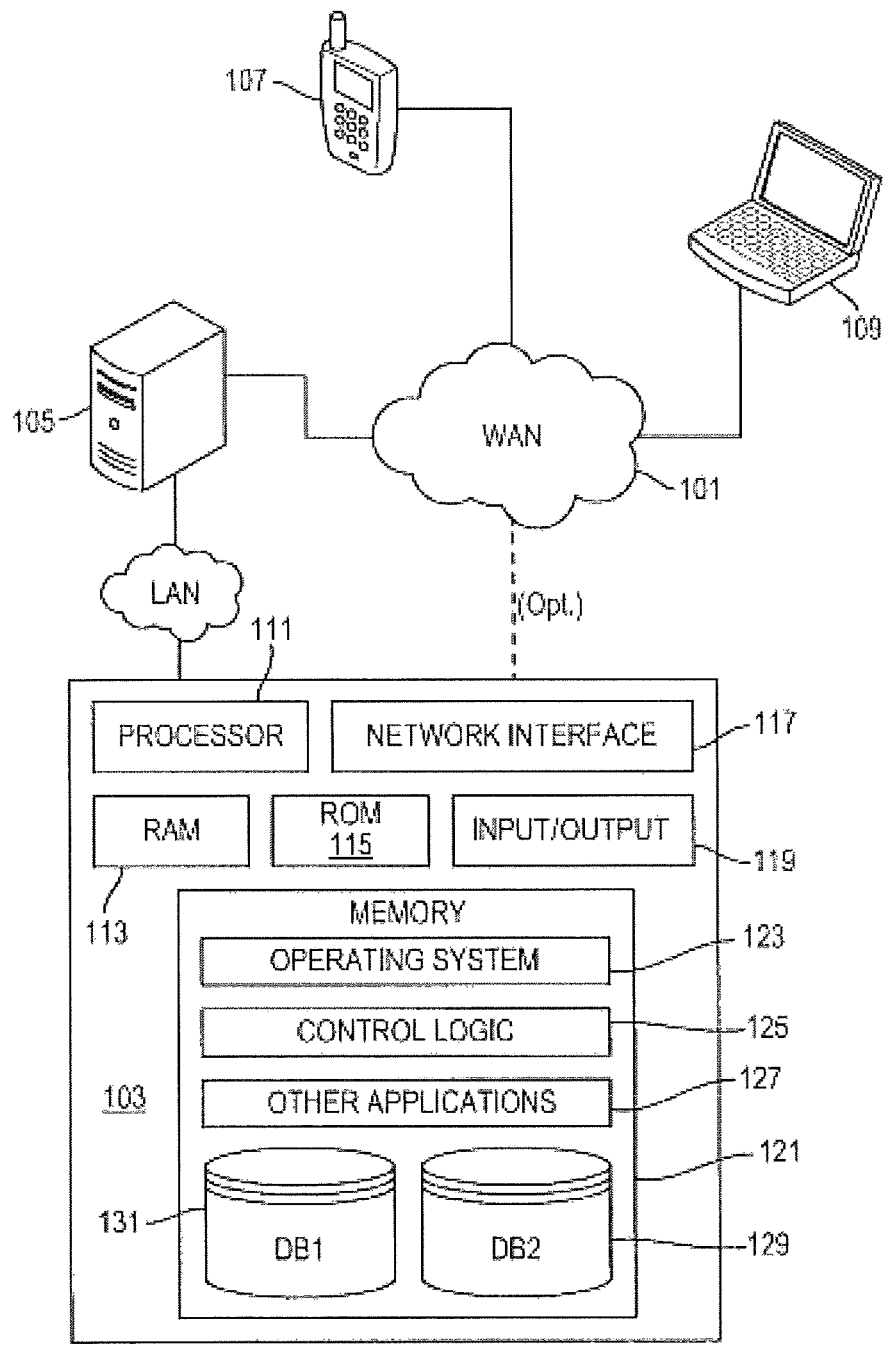
FIG. 1 depicts an illustrative computer system architecture that may be used in accordance with one or more illustrative aspects described herein.

Computer software, hardware, and networks may be used in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data attributable to a single entity that resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be used, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
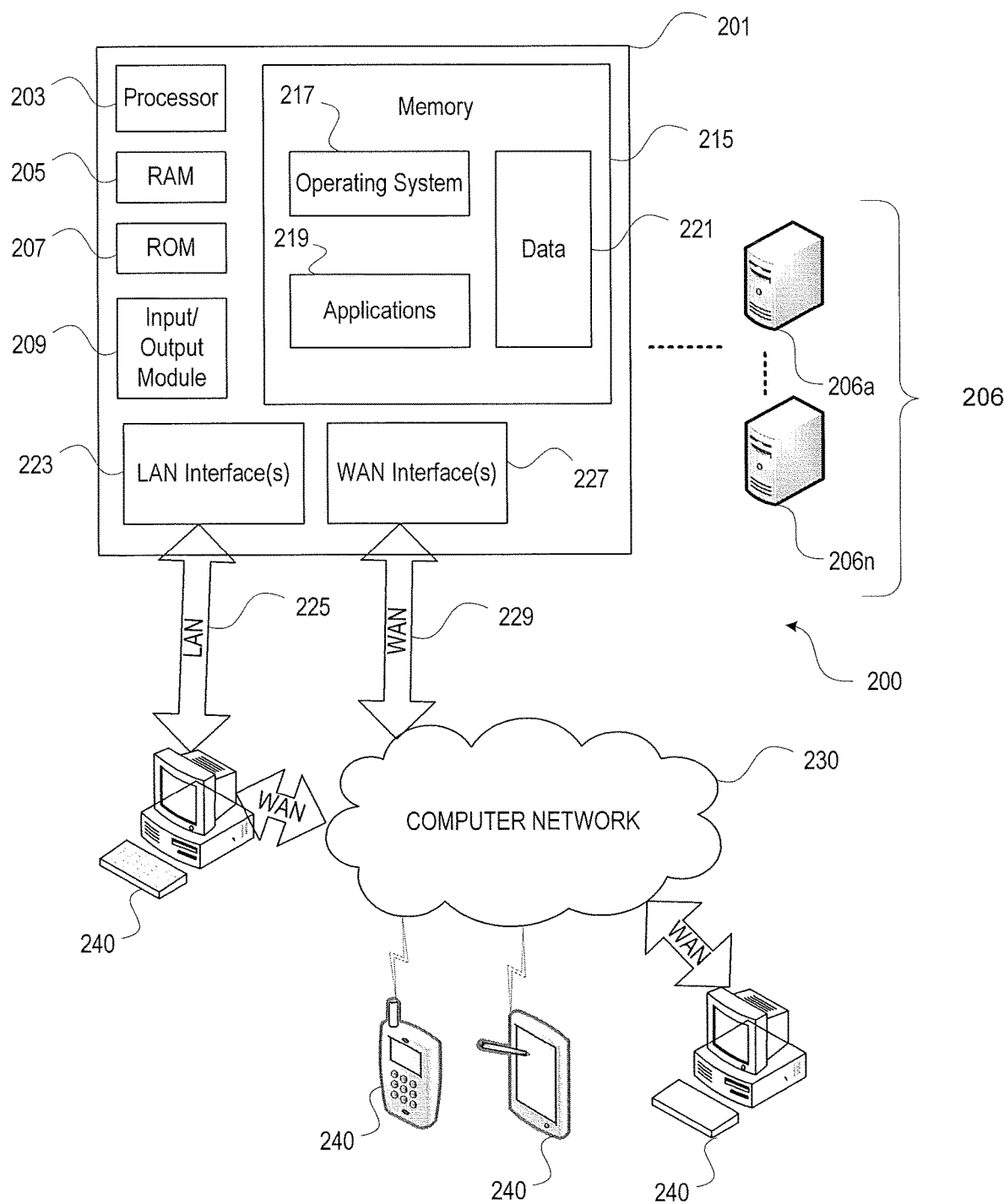
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks, such as a metropolitan area network (MAN). When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet).

It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system (OS) in which local and/or remote applications can be integrated. Applications may include programs that execute after an instance of an OS (and, optionally, also the desktop) has been loaded. Each instance of the OS may be physical (e.g., one OS per device) or virtual (e.g., many instances of an OS running on a single device). Each application may be executed on a local device, or executed on a remotely located device (e.g., remoted).

Figure 3:
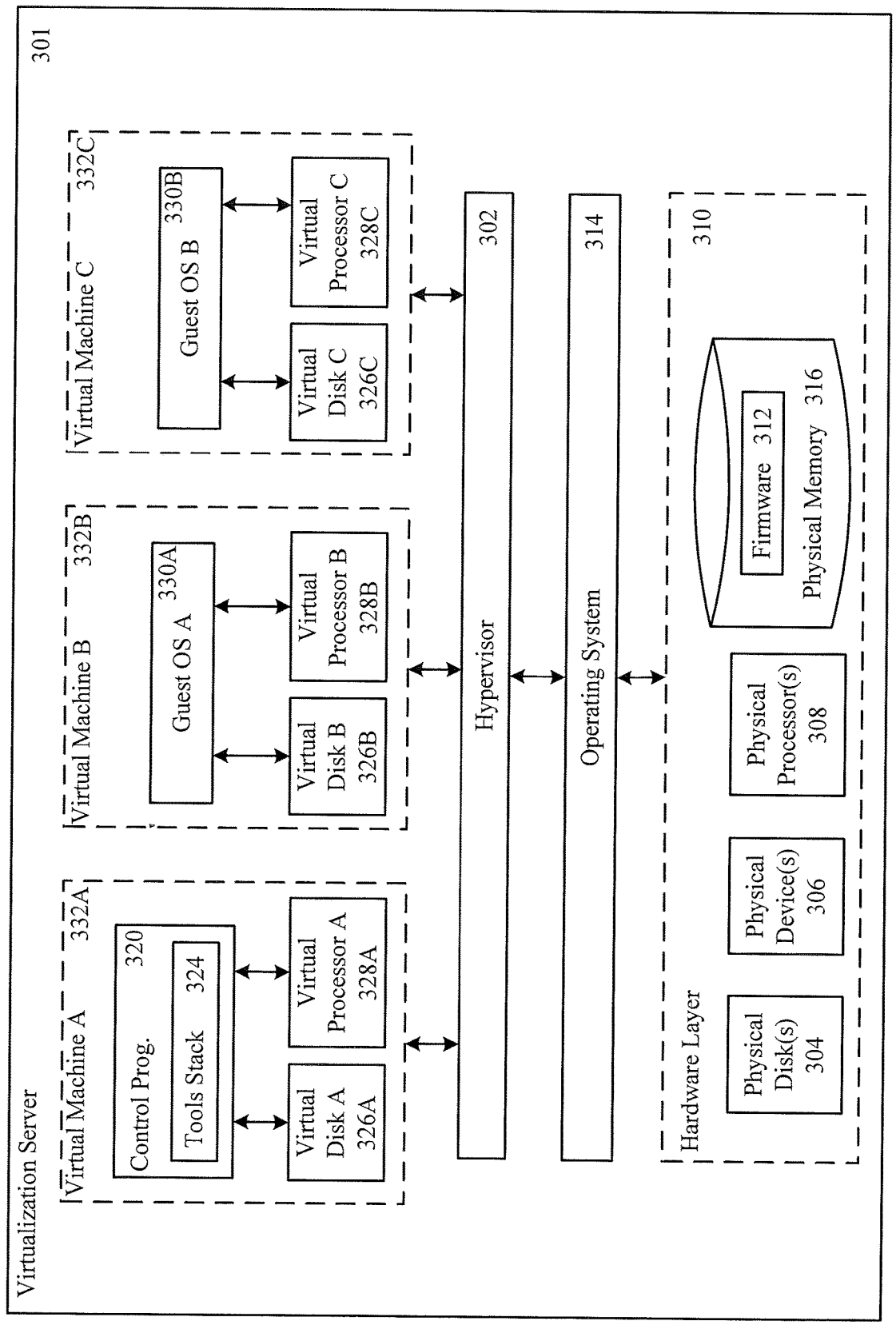
FIG. 3 depicts an illustrative virtualization (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
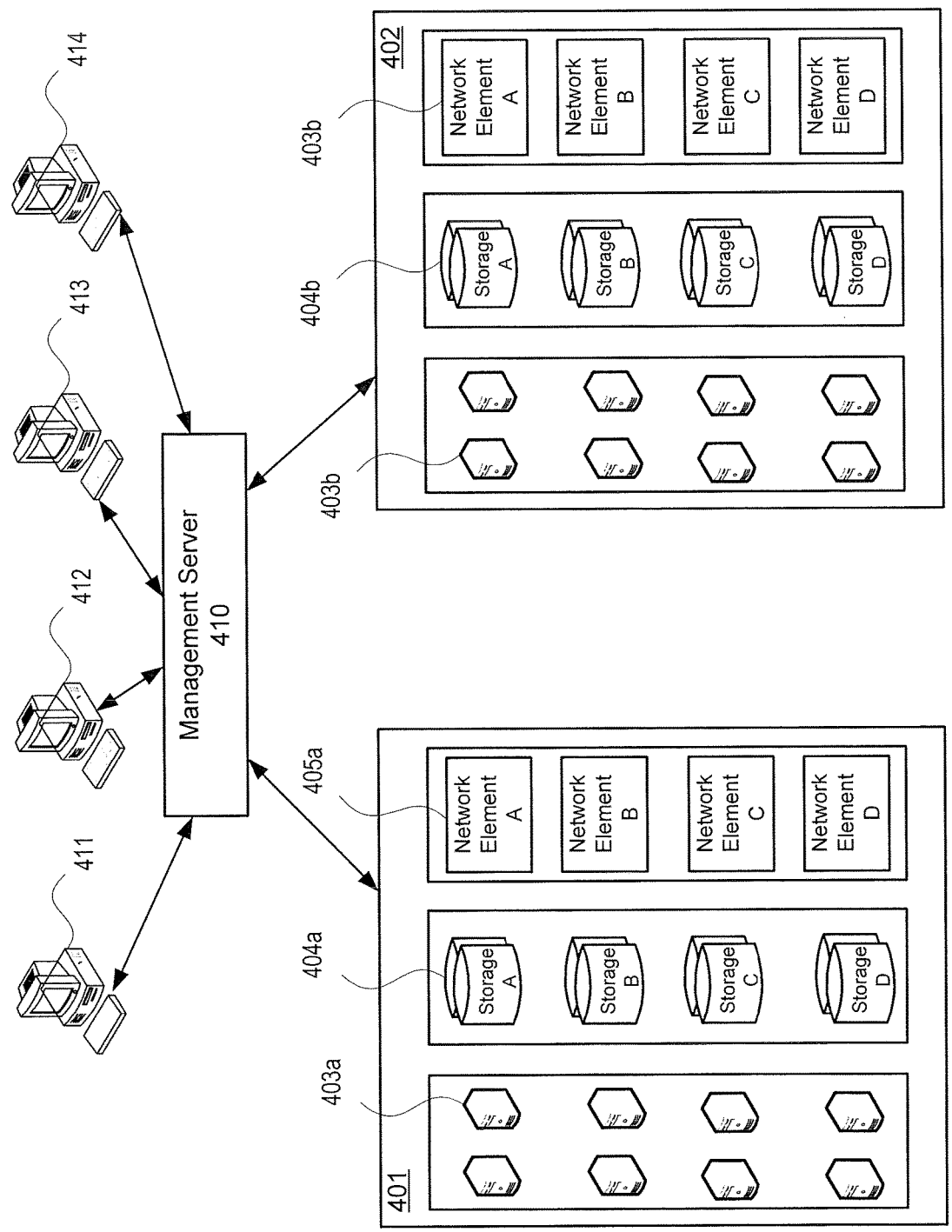
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. Management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (by Microsoft Corporation), AMAZON EC2 (by Amazon.com Inc. of Seattle, Wash.), IBM BLUE CLOUD (by IBM Corporation of Armonk, N.Y.), or others.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing extensible, decentralized health checking of cloud-based service components and capabilities.

Figure 5:
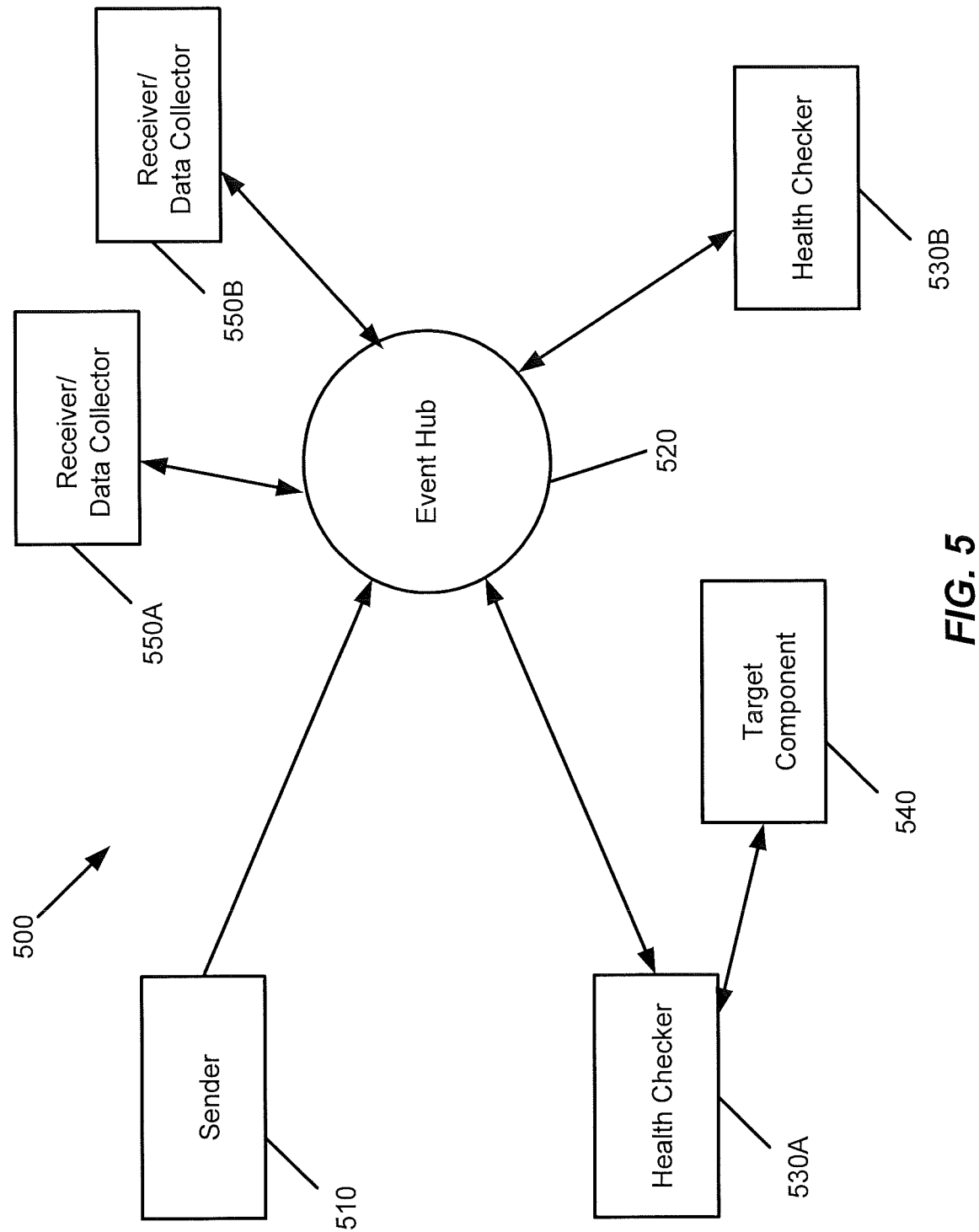
FIG. 5 depicts an illustrative system architecture for enabling decentralized health checking of a cloud-based service, in accordance with one or more illustrative aspects described herein.

FIG. 5 shows an extensible, decentralized health check monitoring system 500 according to one or more embodiments, in which a sender 510 outputs a health check request onto a network, such as a LAN, MAN, WAN, or the Internet, in order to obtain health information on one or more components communicatively connected to the network. Due the decentralized nature of the health check system, sender 510 does not need to know beforehand information regarding health checkers on the network that collect health check information on components connected to the network. Rather, sender 510 outputs a health data request onto the network, which is received by an event hub 520 that is communicatively connected to sender 510 via the network.

Upon receiving the health data request, event hub 520 outputs the health data request to health checkers on the network, whereby a first health checker 530A and a second health checker 530B are shown in FIG. 5. Each health checker 530A, 530B determines, based on the information provided in the health data request output by event hub 520, whether or not the health checker can perform a health check on a target component 540 that is the subject of the health data request output by sender 510.

In the example shown in FIG. 5, health checker 530A determines that it is capable of performing the health checks requested on the target component 540 based on the information provided in the health data request and the capabilities of health checker 530A, whereas health checker 530B determines that it is not capable of performing the health checks requested on the target component 540 based on the information provided in the health data request and the capabilities of health checker 530B. The inability of health checker 530B to perform the health checks on the target component 540 may be due to the capabilities of health checker 530B (e.g., not communicatively connected to the target component 540), or due to health checker 530B not having current processing resources available for performing the health checks requested (e.g., health checker 530B is busy performing health checks on other components of a cloud-based service).

Continuing with the example system shown in FIG. 5, health checker 530A monitors target component 540 for health data, and prepares and outputs a health check response to event hub 520. Since health checker 530B is not capable of responding to the health check request output by sender 510, it does not provide any health check data to event hub 520.

Event hub 520 collects health response data output by health checker 530A and by other health checkers on the network, and outputs the health response data provided to event hub 520 by health checker 530A responsive to a respective health data request output by sender 510 that was the basis for health checker 530A performing the health check.

Event hub 520 outputs health data of target component 540 to each receiver/data collector on the network. Each receiver/data collector correlates the health data responses output by event hub 520 with the corresponding health data request that caused the health data to be measured. Each receiver/data collector may filter the output of event hub 520 to only receive particular data, such as health-related data (e.g., health data requests and health data responses) output by event hub 520, or to only receive health data responses associated with a particular cloud-based component (e.g., health data associated with target component 540). In some embodiments, each device on the network subscribes to only receive particular types of data output by event hub 520, so that each device is not inundated with data that it is not interested in.

In FIG. 5, there is shown receiver/data collector 550A and receiver data/collector 550B, both of which receive the health data output by event hub 520. By way of example, receiver/data collector 550A may choose to collect and process the health data because the type of health data is pertinent to a team associated with receiver/data collector 550A, and receiver/data collector 550B may choose to ignore the health data because the type of health data is not pertinent to a team associated with receiver/data collector 550B. For example, if the health data is data indicating the number of users currently accessing a cloud-based service, and if receiver/data collector 550A is associated with a customer service team and receiver/data collector 550B is associated with a networking team, then receiver/data collector 550A may choose to receive and process the health data, and receiver/data collector 550B may choose to ignore and thus not process the health data.

Receiver/data collector 550A may be configured to process the health data of target component 540 as output by event hub 520 in a particular manner, such as to create a pie chart showing in visual form the available processor capabilities of target component 540 over a particular period of time. For example, receiver/data collector 550A may output a pie chart indicating that the processor of target component 540 was utilized at a 65% rate during the last 24 hour period, whereby this information may be provided to a system administrator communicatively connected to receiver/data collector 550A. Each receiver/data collector may aggregate the health data of target component 540 in its own particular way to suit the needs of a team associated with that receiver/data collector, such as displaying charts and usage trends to customers with respect to a customer service team, or displaying processor and memory usage information to a network administrative team. Whenever a new health checker or receiver/data collector is added to or removed from the health check system, a software update or upgrade to the system is not needed, since each device acts independently of the other components of the health check system.

Receiver/data collector 550B may be configured to process the health data of target component 540 as output by event hub 520 in a manner different than receiver/data collector 550A, to suit the needs of users communicatively connected to receiver/data collector 550B. For example, while receiver/data collector 550A provides pertinent health check data to system administrators of a cloud-based service, receiver/data collector 550B provides pertinent health check data to customers of the cloud-based service, who may be most interested in lag time of target component 540 with respect to other components of the cloud-based service. For example, if receiver/data collector 550B provides health check information to customers of a cloud-based service indicating that a service performed by target component 540 is currently experiencing a 30 minute lag time from when the service is requested by a customer to when the service is performed by target component 540, the customer may choose to request that the service be performed by another component of the cloud-based service, or that a different service be performed for the customer by the cloud-based service.

The health check system 500 as shown in FIG. 5 is extensible in that when a health checker is added to the network, such as a third health checker (not shown in FIG. 5), health check system 500 does not require a software update to sender 510 or to event hub 520 due to this addition of a health checker to health check system 500. Rather, sender 510 does not need to know which health checkers are currently available to operate on a health data request output by sender 510, and only needs to know which target component is to be checked and the type of health check data that is being requested. Similarly, event hub 520 outputs the health data request onto the network, and health checkers currently on the network receive the health data request and either choose to perform a requested health check on target component 540, or to not perform a requested health check on target component 540. When a health checker is removed from the network, such as health checker 530B being temporarily removed from the network due to a maintenance issue that needs to be performed on health checker 530B, health check system 500 does not require a software update to sender 510 or to event hub 520 due to this removal of a health checker from health check system 500. Also, health checkers and receiver/data collectors do not have to integrate with a cloud-based service, but rather obtain authorization to access event hub 520 in order to provide health data to event hub 520 (by the health checkers) and receive and process health data output by event hub 520 (by the receiver/data collectors). This enables the health data payload to be opaque to a cloud-based platform that administers the cloud-based service, whereby a sender sends out a request for health data that it can understand and act on, and a receiver/data collector only operates on requests that it can understand and process.

In some embodiments, each health checker and each receiver/data collector registers with event hub 520 in order to receive pertinent health information from event hub 520. Registration may be performed when a health checker or a receiver/data collector first connects to a cloud-based platform that includes one or more cloud-based services, for example. Each health checker registers with event hub 520 as a "health checking component" to receive health data requests from event hub 520, and each receiver/data collector registers with event hub 520 as a "receiver/data collection component" to receive both health data requests output by event hub 520 and health data responses output by event hub 520. When event hub 520 receives a health data request output by sender 510, event hub 520 outputs the health data request to each health checker and to each receiver/data collector that has registered with event hub 520. When event hub 520 receives a health data response from a health checker, event hub 520 outputs the health data response to each receiver/data collector that has registered with event hub 520. When a health checker or a receiver/data collector is no longer available to participate in the health checking of a service or component of the cloud-based platform, the health checker or receiver/collector may notify event hub 520 in order to no longer receive pertinent health information output by event hub 520.

Some embodiments also enable a sender to request a new type of health data that previously has not been monitored and processed in the cloud-based platform. Receiver/data collectors that are capable of processing the new type of health data can perform such processing and provide output to the sender in a particular format desired by the sender, without requiring any changes, such as software updates, to the cloud-based platform. By way of example, a sender may request a timeline associated with how many users have accessed a public cloud storage over the last week. A health checker that is able and available to obtain such information may act on the request and output health data responses to the event hub, and a receiver/data collector that is able and available to process such information in the particular format desired by the sender receives health data responses output by the event hub and processes that data for presentation to the sender and/or to an entity associated with that receiver/data collector. In such a configuration, the health checker may be unaware of the identity of the sender and the identity of the receiver/data collector, whereby the health checker acts on health data requests output by the event hub without needing to know from which entity the event hub obtained the health data requests. Similarly, the receiver/data collector may be unaware of the identity of the sender that output the health data request and the identity of the health checker that output the health data responses, whereby the receiver/data collector acts on health data responses output by the event hub without needing to know from which entity the event hub obtained the health data responses.

Figure 6:
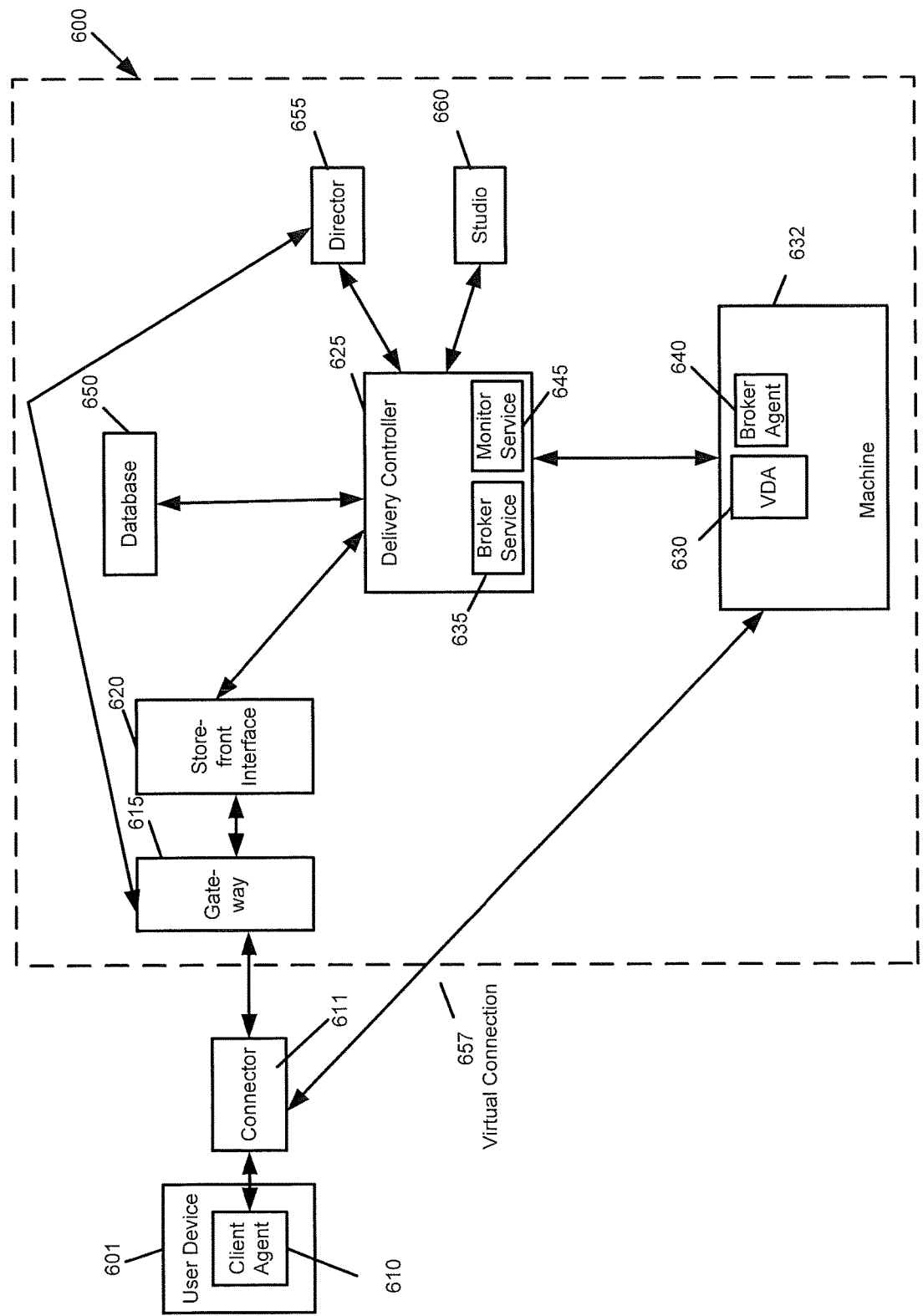
FIG. 6 depicts an illustrative virtualization system architecture for which health data may be obtained on one or more components, in accordance with one or more illustrative aspects described herein.

FIG. 6 is a block diagram of a cloud-based virtualization system or virtualization environment 600 that may have the health checked of one or more components in accordance with one or more embodiments described in detail below. The virtualization system 600 may be accessed, for example, by way of a XENAPP or a XENDESKTOP application that is provided on a user's computer, desktop, smart phone, or other type of electronic device, to provide anywhere access to various applications to the user. XENAPP and XENDESKTOP allow end users to run applications and desktops independently of the device's operating system and interface. XENAPP and XENDESKTOP also allow administrators to manage the network and provide or restrict access from selected devices or from all devices. Further, XENAPP and XENDESKTOP allow administrators to manage an entire network from a single data center or from multiple data centers.

A feature of a cloud-based virtualization system, such as one accessible via a XENAPP or a XENDESKTOP application, is an ability to integrate provisioning of resources to multiple users who desire virtual access to one or more applications or provisioned desktops on respective devices (e.g., PCs, tablets, smart phones) of the users. To create such a virtualization system, various components may be provided to allow users to connect remotely to applications and desktops, as well as to gather and log data about user activities on the virtualization system.

As shown in FIG. 6, client agent 610 may be installed on user device 601 as an application. In more detail, client agent 610 may be a software application executing on user device 601 that facilitates communications with remote resources and/or virtualized resources, such as communications with virtualization system 600. Client agent 610 supplies the connection to a virtual machine via a network connection, such as via a hypertext transfer protocol (HTTP) network connection using port 80 or a secure hypertext transfer protocol (HTTPS) network connection using port 443. Client agent 610 may correspond to CITRIX RECEIVER by Citrix Systems, Inc. in some embodiments.

Client agent 610 communicates with storefront interface 620 via a network connection (e.g., via a TCP connection on port 80 or port 443), whereby connector 611 is used to connect to the virtualization system 600. Connector 611 may be provided on a device other than user device 601, such as being provided on a server (not shown in FIG. 6) within the same network that user device 601 is associated with. Storefront interface 620 is a component of the virtualization system 600, which may be accessible to user device 601 via a gateway 615 or other type of network access device (e.g., edge server). Gateway 615, which may be implemented as a NETSCALER GATEWAY by Citrix Systems Inc. in some embodiments, may provide administrators of the virtualization system 600 granular application-level and data-level control of virtual sessions, while enabling users with remote access to virtual servers and desktops from any location. Storefront interface 620 performs authentication of users desiring access to the virtualization system 600, and once authenticated, users can then access data by way of user device 601. For example, an authenticated user can access applications stored on the user's work computer at the user's home computer, via the virtualization system 600 shown in FIG. 6.

As shown in FIG. 6, delivery controller 625 communicates with storefront interface 620 via a network connection, to provide data to and from user device 601. Delivery controller 625 corresponds to the central management component of virtualization system 600 that provides services that manage resources, applications, and desktops, and that optimizes and balances the loads of connections to multiple users desiring access to virtualization system 600.

Virtual delivery agent (VDA) 630 is communicatively connected to the delivery controller 625 via a network connection (e.g., an HTTP or an HTTPS connection via the Internet), and may be installed, for example, as an application on machines running WINDOWS SERVER, WINDOWS DESKTOP, or LINUX operating systems, such as machine 632 shown in FIG. 6. VDA 630 allows these machines and the resources they host to be made available to users. The VDA-installed machines running a WINDOWS SERVER OS, a LINUX OS, or any other OS allow the machines to host multiple connections for multiple users, and may be connected, for example, to users on one or more of the following ports:

TCP port 80 or port 443 if Secure Socket Layer (SSL) is enabled

TCP port 2598, if CITRIX GATEWAY PROTOCOL (CGP) is enabled, which enables session reliability TCP port 1494 if CGP is disabled or if the user is connecting with a legacy client Delivery controller 625 sets up a virtual connection between VDA 630 and user device 601, by using a protocol such as CGP, to enable user device 601 to access applications and data stored on the machine that hosts VDA 630. For example, machine 632 that hosts VDA 630 may be a user's work computer located 30 miles the user's home, whereby the user can access applications and files stored on the user's work computer at user device 601 that may be the user's home computer located at the user's home. As a result, user device 601 operates as the user's virtual work computer. Alternatively, machine 632 may be a server provided on a cloud accessible via the Internet, by which a user may access applications loaded on the machine 632 via virtual connection 657.

Virtualization system 600 also may include broker service 635, which may be a component of delivery controller 625 in some embodiments, or which may be a separate component communicatively connected to delivery controller 625 in other embodiments. Broker service 635 tracks which users are logged in and where, what session resources the users have, and if users need to reconnect to existing applications. Broker service 635 is communicatively connected with broker agent 640, whereby broker agent 640 may be a component provided on the machine 632 that hosts VDA 630. The network connection between broker service 635 and broker agent 640 may be, for example, via TCP port 80 (an unsecured network connection) or TCP port 443 (a secured network connection). In some implementations that utilize a WINDOWS OS, broker service 635 may execute POWERSHELL, which is an object-oriented programming language and interactive command line shell for WINDOWS, in order to automate system tasks, such as batch processing, and create systems management tools for commonly implemented processes.

Broker agent 640 has the capability to host multiple plugins and collect real-time data, such as data obtained from a virtual connection between machine 632 and user device 601. Broker agent 640 may be hosted on machine 632 that also hosts VDA 630 (and is communicatively connected to VDA 630), whereby broker agent 640 may be communicatively connected to delivery controller 625 via a network connection, for example, via TCP port 80 or TCP port 443.

Monitor service 645 may also be provided as a part of virtualization system 600, and may be a component of delivery controller 625 in some embodiments, or may be a separate component communicatively connected to delivery controller 625 in other embodiments. Monitor service 645 collects historical data and stores the historical data in database 650, which may be a SQL database or other type of database that can store data and from which data can be readily retrieved. Monitor service 645 may communicate with other components of virtualization system 600 via a network connection, for example, via a network connection using TCP port 80 or TCP port 443.

Database 650 stores data for delivery controller 625, such as site policies, machine catalogs, and delivery groups. Database 650 may be a SQL database or an ORACLE database, or any other type of database from which data can be stored therein and retrieved therefrom.

As discussed briefly above, gateway 615 provides a secure access inside or outside a LAN or WAN firewall, and may be used to authenticate devices attempting to access virtualization system 500 that is provided within the LAN or WAN.

Director 565 may be a web-based tool that allows administers access to real-time data from broker agent 640, historical data from database 650, and data from gateway 615, for troubleshooting and support. Director 655 may communicate with delivery controller 625 via a network connection, for example, via TCP port 80 or TCP port 443.

Studio 660 operates as a management console that allows administers to configure and manage sites, and gives access to real-time data from broker agent 640. Studio 660 may communicate with delivery controller 625 via a network connection, for example, via TCP port 80 or TCP port 443.

Operation of virtualization system 600 will now be explained briefly. Virtualization system 600 is made up of machines with dedicated roles that allow for scalability, high availability, and failover, and provides a solution that is secure by design. Virtualization system 600 may include a plurality of VDA-installed servers, desktop machines, and delivery controller 625, whereby delivery controller 625 manages access to the VDA-installed servers and desktop machines from requests made by user devices, such as a request from user device 601 to access an application or file stored on machine 632.

VDA 630 enables users to connect to desktops and applications. VDA 630 may be installed on server or desktop machines within a data center for most delivery methods to user devices located outside the data center. VDA 630 may also be installed on physical PCs for remote PC access, such as remote PC access to machine 632 from user device 601.

Delivery controller 625 comprises a plurality of independent services that manage resources, applications, and desktops, and optimize and balance user connections. Virtualization system 600 may include one or more delivery controllers based on the number of VDA-installed servers and desktop machines controlled by virtualization system 600. Because sessions are dependent on latency, bandwidth, and network reliability, the one or more delivery controllers ideally may be hosted on the same LAN or on separate LANs.

Users are not provided direct access to delivery controller 625. Rather, VDA 630 serves as an intermediary between users, such as a user of user device 601, and delivery controller 625. When users log on to virtualization system 600 using storefront interface 620, their credentials are passed through to broker service 635, which obtains their profiles and available resources based on the policies set for the users.

To start a virtual session, the user connects to virtualization system 600 via client agent 610 and connector 611, which are installed on user device 601 and a network server, respectively. Within client agent 610, the user selects the physical or virtual desktop or virtual application that is needed. For example, the user selects machine 632. The user's credentials move from client agent 610, connector 611, gateway 615, storefront interface 620, to delivery controller 625, whereby delivery controller 625 determines what resources are needed by communicating with broker service 635. In some embodiments, storefront interface 620 may have access to a security certificate, e.g., a Secure Socket Layer (SSL) certificate, to encrypt the credentials coming from client agent 610.

Broker service 635 determines which desktops and applications the user is allowed to access. Once the credentials are verified, the information about available apps or desktops is sent back to user device 601 through a storefront interface 620-gateway 615-connector 611-client agent 610 pathway. When the user selects applications or desktops from this list, that information goes back down the storefront interface 560-gateway 615-connector 611-client agent 610 pathway to delivery controller 625, which determines the proper VDA to host the specific applications or desktop. In the example shown FIG. 6, the proper VDA is VDA 630 hosted on machine 632.

Delivery controller 625 sends a message to VDA 630 (hosted on machine 632) with the user's credentials, and sends the data about the user and the connection to VDA 630. VDA 630 accepts the connection and sends the information back through the same pathways all the way to client agent 610 on user device 601. Client agent 610 bundles the information that has been generated in the session to create a session file 660 on user device 601.

A session file stored in machine 632 may be used by user device 601 to establish a direct connection, shown as virtual connection 657 in FIG. 6, between user device 601 and a file/stack component running on VDA 630 hosted on machine 632. This connection bypasses client agent 610, connector 611, gateway 615, storefront interface 620, and delivery controller 625.

The direct connection 657 between user device 601 and VDA 630 (via connector 611) may use a specific protocol, such as the Citrix Gateway Protocol (CGP). If the direct connection 657 is lost, the user need only reconnect to VDA 630 rather than having to relaunch through a management infrastructure that includes client agent 610, connector 611, storefront interface 620, and delivery controller 625. Once user device 601 connects to VDA 630, VDA 630 notifies delivery controller 625 that the user is logged on, and delivery controller 625 sends this information to database 650 and starts logging data using monitor service 645.

Within delivery controller 625, broker service 635 reports session data for every session on the virtual machine providing real-time data. Monitor service 645 tracks the real-time data and stores it as historical data in database 650. In this regard, broker service 635 may operate as a health checker 530A or 530B as shown in FIG. 5.

Studio 660 communicates with broker service 635 and is used to deploy a virtualization environment, whereby studio 660 has access to real-time data. Director 655 communicates with broker service 635 to access database 650, and is used to support users of the virtualization system 600. Director 650 may provide a dashboard to an administrator, which shows the number of sessions, if there are any failed sessions, session durations, applications running on each session, etc. In this regard, director 650 may operate as a receiver/data collector 550A or 550B as shown in FIG. 5.

An example of a component of FIG. 6 that may be health checked by way of an extensible, decentralized health check system according to one or more embodiments is described in detail below. In this example, the component to be monitored for its health is connector 611, which connects the customer to the cloud-based virtualization system 600, and which may be remotely managed by the cloud-based virtualization system 600. In this example, connector 611 may be monitored for CPU utilization, memory utilization, network utilization, the number of processes running on connector 611, etc., whereby if health check data indicates that one or more of these features is in an 'abnormal' range of operation, connector 611 may be attempted to be fixed or the customer may be notified that services may be negatively affected due to problems associated with connector 611.

Turning now to FIG. 5, health checker 530A may be provided on the user's network, such as on a server on which connector 611 is provided in FIG. 6, and may be used to check such health data as whether connector 611 is communicatively connected to an Active Directory application. Health checker 530B may also be provided on the user's network and may be used to check whether connector 611 is communicatively connected to a hypervisor provided on user device 601. Also, another health checker (not shown in FIG. 5) may be provided on the cloud and not on the user's network, and may be used to check the network connectivity status of connector 611 with respect to connection to the cloud. Each health checker may check the health of connector 611 independently of the other health checkers that may also be checking the health of connector 611. Continuing with this example, if the collector health response data indicates that a cloud-based service cannot communicate with the hypervisor on the user device 601 but can communicate with the Active Directory application on the user device 601, then the problem is likely a networking problem and the user device itself is likely not the problem that needs correction.

In this example, health checker 530A of FIG. 5 may be assigned to a networking team, and checks the status of connector 611 of FIG. 6 to determine whether connector 611 is properly connected to the cloud-based virtualization system 600. Health checker 530B of FIG. 5 may be assigned to a customer service team, and checks the status of connector 611 of FIG. 6 to determine whether connector 611 is properly connected with other cloud-connecting components also operating on user device 601, such as a XENAPP application or a XENDESKTOP application. Health check data output by health checker 530A and health check data output by health checker 530B may be received by event hub 520, and output to receiver/data collector 550A and to receiver/data collector 550B. Receiver/data collector 550A may be assigned to the networking team, and may correlate and process the health check data of health checker 530A and ignore the health check data of health checker 530B. Similarly, receiver/data collector 550B may be assigned to the customer service team, and may correlate and process the health check data of health checker 530B and ignore the health check data of health checker 530A.

In some embodiments, the functions of event hub 520 of FIG. 5 may be performed by delivery controller 625 shown in FIG. 6, or by another component (e.g., storefront interface 620, or gateway 615) of cloud-based virtualization system 600.

Figure 7:
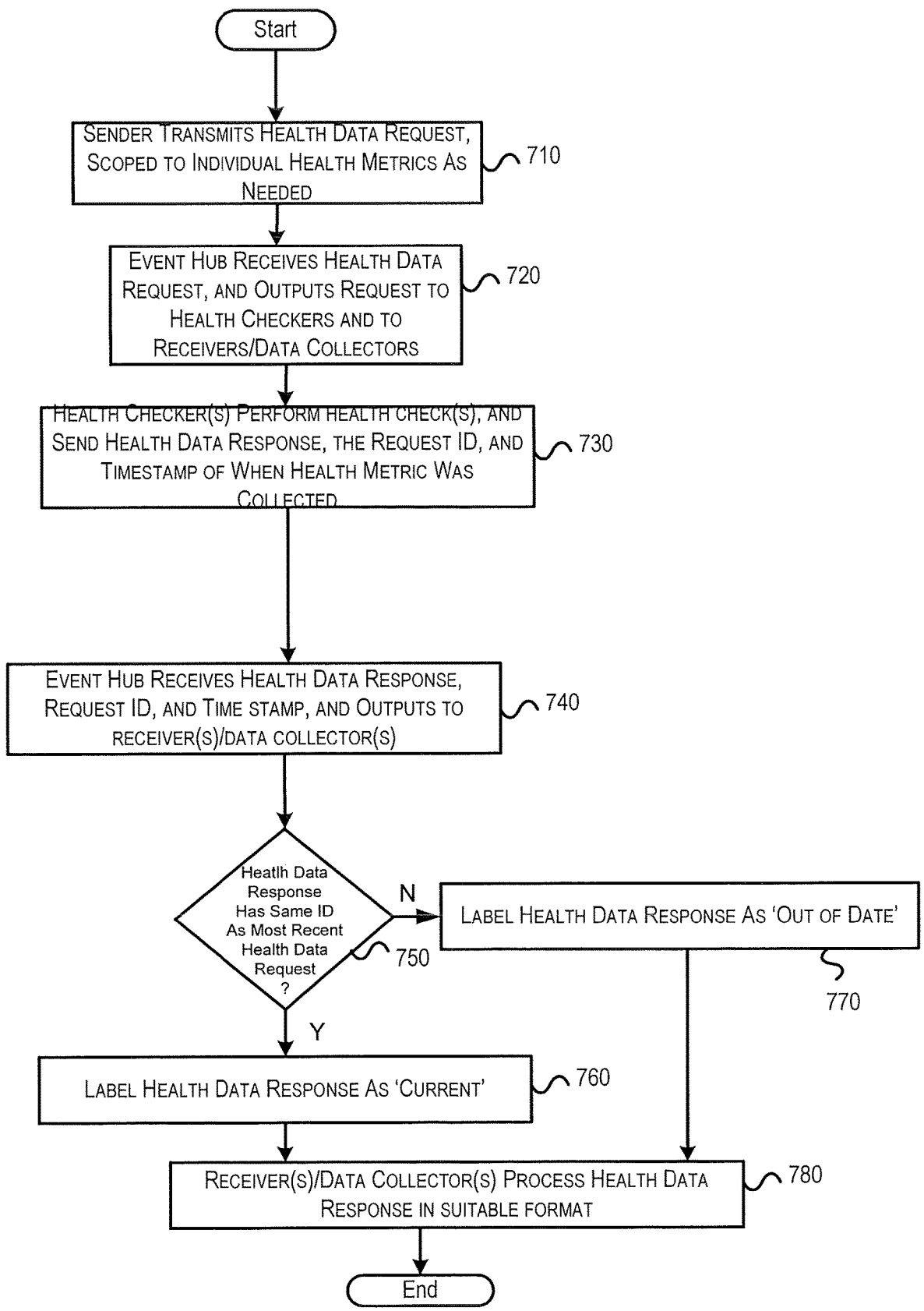
FIG. 7 depicts a flowchart that illustrates a method of requesting, performing, and collecting health information on a cloud-based service in a decentralized manner, in accordance with one or more illustrative aspects described herein.

FIG. 7 is a flow diagram of an extensible, decentralized health check method, according to one or more embodiments, whereby any one of the components shown in FIG. 6 may be checked for health using an extensible, decentralized health check scheme according to one or more embodiments as described herein. By way of example, the health of connector 611 provided on user device 601 may be checked based on a health check request output by an administrator of the cloud-based virtualization system 600, who then may receive and act on health check results provided, for example, by way of a dashboard display via Director 655.

In step 710, a sender (i.e., sender 510 in FIG. 5) transmits a health data request onto a network, whereby the health data request may be scoped to individual health metrics as desired. FIG. 8 shows one possible implementation of a health data request 800 output by a sender, which includes: a) device ID of health data requester (e.g., MAC address of health data requester), b) ID of health data request output by health data requester (e.g., health data request #3), c) device ID of device to be checked for its health (e.g., MAC address of device to be checked for its health), d) health events to be checked (e.g., memory utilization percentage), e) format for providing health check information (e.g., as a pie chart), and f) time period within which health check data is to be obtained from device for this request (e.g. within the last hour).

Returning back to FIG. 7, in step 720, event hub (i.e., event hub 520 in FIG. 5) receives the health data request, and outputs the request to health checkers (e.g., health checkers 530A, 530B) and receiver/data collectors (e.g., receiver/data collectors 550A, 550B) subscribed to receive output from event hub.

In step 730, health checkers that are capable of acting on the health data request perform health check on the device to be checked for its health, and output a health data response with associated health check data, including the time when the health data was collected.

FIG. 9 shows one possible implementation of a health data response 900 output by a health checker, which includes: a) device ID of health data requester (e.g., MAC address of health data requester), b) device ID of health data checker (e.g., MAC address of health data checker), c) ID of health data request output by health data requester (e.g., health data request #3) d) device ID of device to be checked for its health (e.g., MAC address of device to be checked for its health), and e) health check data obtained from device to be checked for its health.

Returning back to FIG. 7, in step 740, event hub receives the health data response, the request ID, the time stamp, and outputs that information to receivers/data collectors subscribed to receive output from event hub.

FIG. 10 shows one possible implementation of a health data response 1000 output by an event hub, which includes:

a) device ID of health data requester (e.g., MAC address of health data requester), b) device ID of health data checker (e.g., MAC address of health data checker), c) ID of health data request output by health data requester (e.g., health data request #3) d) device ID of device to be checked for its health (e.g., MAC address of device to be checked for its health), and e) health check data obtained from device to be checked for its health.

Returning back to FIG. 7, in step 750, the receiver/data collectors that have determined that they should process the output from event hub determine whether the health data included in the health data response is associated with the ID of the most recent health data request output by the sender. If Yes, in step 760, the health data is categorized as "current"; if No, in step 770, the health data is categorized as "out of date."

In step 780, each receiver/data collector that has determined that the health data is pertinent to its assigned team processes the health data output by event hub in a suitable format, and provides that formatted information to it respective team (e.g., a network administrator team). The information may include designations as to which data being presented to the team represents "current" health data and which data being presented to the team represents "out of date" data.

FIG. 11 shows one possible implementation of a health data response 1100 output by an event hub, which includes: a) a) device ID of health data requester (e.g., MAC address of health data requester), b) device ID of health data checker (e.g., MAC address of health data checker, c) device ID of device to be checked for its health (e.g., MAC address of device to be checked for its health), d) ID of health data request output by health data requester (e.g., health data request #3), and e) health check data provided in a suitable format.

Figure 12:
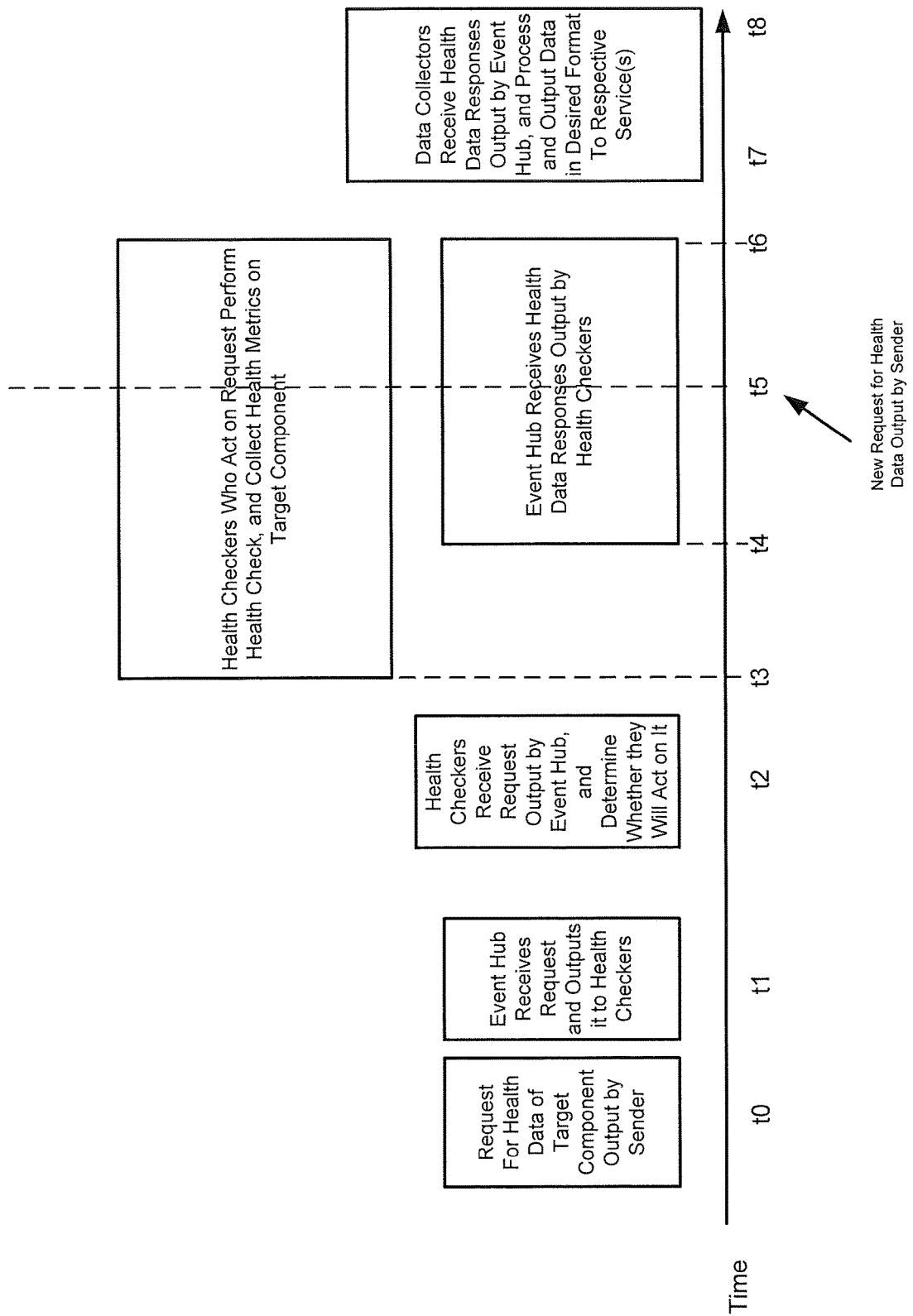
FIG. 12 depicts a time line showing when health data requests and health data responses are processed and handled by an event hub and by health checkers, in accordance with one or more illustrative aspects described herein.

FIG. 12 is a time line showing how health check data is labeled as either "out of date" or "current", in accordance with one or more embodiments. At time t0, a request for health data of a target device is output by a sender, and received by the event hub at time t1. Event hub outputs the request at a time t1+Δ, whereby Δ corresponds to a small amount of time that may be on the order of microseconds or milliseconds. At time t2, health checkers receive the request output by event hub, and determine whether they will act on the request. At time t3, health checkers that have determined that they will act on the request start performing health check and collect health metrics of the target device. This collection may be performed between time t3 and time t6 in FIG. 12. At time t4, event hub starts to receive health data responses output by health checkers, and continues to receive health data responses between time t4 and t6 in FIG. 12.

At time t5 that occurs after time t4 and before time t6, the sender outputs a new request for health data of the target device, which is received by event hub soon thereafter (e.g., at time t5+Δ). At time t7, data collectors receive health data responses output by event hub, and start to process those health data responses, whereby the processing is performed between time t7 and time t8.

In the example shown in FIG. 12, the health data received by event hub between time t4 and time t5 is processed by data collector as "current" health check data, and the health data received by event hub between time t5 and time t6 is processed by data collector as "out of date" health check data, since that data was obtained based on the initial health data request output by the sender (at time t0), and was output by event hub after a subsequent health data request was output by the sender (at time t5). In this manner, the receiver/data collectors correlate the health check data provided by the health checkers, as output by the event hub, based on whether the health check data was obtained from a current health data request output by a requester, or whether the health check data was obtained from a previous health data request output by the requester. In some embodiments, the health check data may trigger a notification on a user display, such as a notification that the memory allocation is above a threshold (e.g., greater than 90% utilization), whereby if the notification is based on "out of date" data, it may be greyed out on the user display, to indicate that the "out of date" data that resulted in the notification was detected based on a previous and thus not current health check request.

Figure 13:
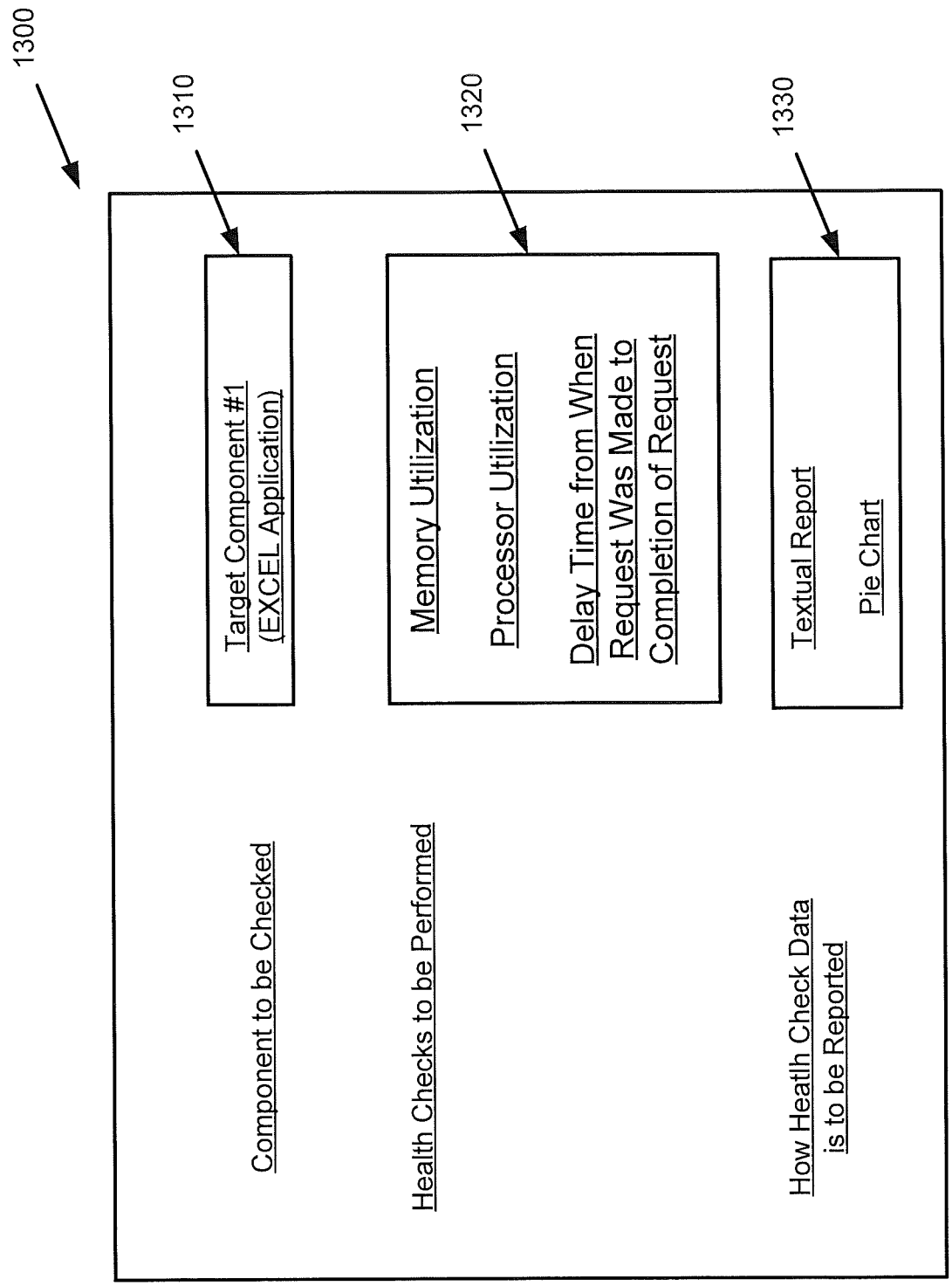
FIG. 13 depicts a user interface that may be used by a sender to create a health data request to be output to an event hub, in accordance with one or more illustrative aspects described herein.

FIG. 13 is a diagram of an exemplary user interface (UI) 1300 provided to a user on a display of a user device, for creating a health data request according to one or more embodiments. In region 1310, the user may enter a component to be checked for its health. For example, a Microsoft EXCEL application on target component 540 of FIG. 5 may be checked for its state of health, based on user selections made in region 1310. In region 1320, the user selects one or more health checks to be performed on the component. For example, memory utilization, processor utilization, and/or delay time from when a request was made to completion of the request may be gathered during a health check, based on user selections made in region 1320. In region 1330, the user selects the format by which the health check data is to be presented to the user (or to the team associated with the user). For example, the health check data may be presented to the user as a textual report or as a pie chart, based on user selections made in region 1330.

The extensible, decentralized features of one or more embodiments may be applied to non-health based systems, in which requesters, checkers, and data collectors are independent of each other and do not need to know the existence of each other on a network. For example, in a user-based system in which plural services are provided to users, each service may have its own database that includes information of which users are connected to that service. In some embodiments, a requester outputs a request for information regarding which users are currently connected to the user-based system, whereby each service of the user-based system operates as a checker and receives the request from an event hub, determines which users are currently using the respective service, and outputs that information to the event hub. Event hub provides the user-connected information to a receiver/connector, which collects the user-connected information provided by each service of the user-based system, and creates a complete set of users that are currently connected to the user-based system. Continuing with this example, if another service added to the user-based system desires information regarding which users are currently connected to the user-based system, that other service may output an appropriate request to an event hub, and obtain a complete set of users of the user-based system by way of a receiver/collector associated with that other service.

As illustrated above, various aspects of the disclosure relate to computer hardware and software for providing extensible, decentralized health checking of components and capabilities of a cloud-based system. While the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A health check method, comprising:
receiving, by a health event hub as output by a first device onto a network, a first health data request for performing a health check on a target device of a plurality of target devices communicatively connected to the network, wherein the first health data request includes a hierarchical identifier of the first health data request;
outputting, by the health event hub onto the network, the received first health data request to each of a plurality of health checkers associated with the network, and communicatively connected to the network;
determining, by each of the plurality of health checkers and based on receiving the first health data request, whether the corresponding health checker of the plurality of health checkers is capable of performing the requested health check on the target device;
performing, by each of the plurality of health checkers and based on determining that the corresponding health checker of the plurality of health checkers is capable of performing the requested health check on the target device, the requested health check on the target device;
receiving, by the health event hub via the network, a health data response output by at least one of the plurality of health checkers that is capable of performing the requested health check on the target device;
collecting, by the health event hub, each health data response associated with the first health data request that is output by the at least one of the plurality of health checkers that is capable of performing the requested health check on the target device;
outputting, by the health event hub to each of a plurality of health data collectors on the network, each health data response associated with the first health data request;
receiving, by the health event hub and during the output of the health data responses associated with the first health data request, a second health data request for performing a health check on the target device, wherein the second health data request includes a hierarchical identifier of the second health data request;
for each health data response output after receipt of the second health data request, comparing, by each of the plurality of health data collectors, a hierarchical request identifier included in the corresponding health data response output to the hierarchical identifier of the second health data request;
in response to identifying that the corresponding health data response includes the hierarchical identifier of the first health data request, identifying, by each of the plurality of data collectors, that the corresponding health data response is out of date; and
in response to identifying that the corresponding health data response includes the hierarchical identifier of the second health data request, identifying, by each of the plurality of data collectors, that the corresponding health data response is current.

2. The health check method of claim 1, further comprising:
outputting, by each of the plurality of health checkers that is capable of performing the requested health check on the target device, a health data response that includes information associated with the requested health check, wherein the information includes:
an identifier of the first device,
an identifier of the corresponding health checker of the plurality of health checkers,
the hierarchical identifier of the first health data request,
an identifier of the target device, and
health data for the target device.

3. The health check method of claim 1, further comprising:
collating the health data responses output by the plurality of health checkers with the first health data request,
wherein a health data response received from the at least one of the plurality of health checkers after the second health data request has been received by the health event hub is not associated with the first health data request by the health event hub.

4. The health check method of claim 1,
wherein one of the plurality of health checkers provides health data to the first device, and
wherein another of the plurality of health checkers provides health data to another device different from the first device.

5. The health check method of claim 1, further comprising:
receiving, by the health event hub, information regarding a new health checker associated with the network and communicatively connected to the network; and
sending, by the health event hub after having received the information regarding the new health checker, the second health data request to the plurality of health checkers and to the new health checker.

6. The health check method of claim 1, wherein the target device comprises a processor, and wherein the health check comprises determining a utilization percentage of the processor during a predetermined time period.

7. The health check method of claim 1, wherein the second health data request includes:
the hierarchical identifier corresponding to the second health data request,
a format in which health information responsive to the second health data request should be displayed, and
a time period within which the health information responsive to the second health data request should be obtained.

8. The health check method of claim 7, further comprising:
formatting, by each of the plurality of health data collectors, the health data responses, wherein formatting the health data responses comprises:
presenting the health data responses identified as current in an unobscured manner, and
presenting the health data responses identified as out of date in an obscured manner.

9. The health check method of claim 8, wherein:
formatting the health data responses comprises formatting the health data responses based on the format specified in the first health data request, and
the format comprises one of more of: a text format or a pie chart.

10. One or more non-transitory computer-readable media storing instructions for performing a health check on a cloud-based service, the instructions, when executed by a cloud-based system that includes at least one processor and a memory, cause the cloud-based system to:
receive, via a network as output by a first device, a first health data request for performing a health check on a target device of a plurality of target devices communicatively connected to the network, wherein the first health data request includes a hierarchical identifier of the first health data request;

output, via the network, the first health data request to each of a plurality of health checkers associated with the network and communicatively connected to the network;

cause each health checker of the plurality of health checkers to, based on receiving the first health data request, determine whether the corresponding health checker of the plurality of health checkers is capable of performing the requested health check on the target device;

cause each health checker of the plurality of health checkers to, based on determining that the corresponding health checker of the plurality of health checkers is capable of performing the requested health check on the target device, perform the requested health check on the target device;

receive a health data response output by at least one of the plurality of health checkers that is capable of performing the health check on the target device;

collect each health data response associated with the first health data request that is output by the at least one of the plurality of health checkers that is capable of performing the health check on the target device;

output, via the network to each of a plurality of health data collectors, each health data response associated with the first health data request;

receive, during the output of the health data responses associated with the first health data request, a second health data request for performing a health check on the target device, wherein the second health data request includes a hierarchical identifier of the second health data request;

for each health data response output after receipt of the second health data request, compare a hierarchical request identifier included in the corresponding health data response output to the hierarchical identifier of the second health data request;

in response to identifying that the corresponding health data response includes the hierarchical identifier of the first health data request, identify that the corresponding health data response is out of date; and in response to identifying that the corresponding health data response includes the hierarchical identifier of the second health data request, identify that the corresponding health data response is current.

11. The one or more non-transitory computer readable medium of claim 10, wherein the instructions, when executed by the cloud-based system, further cause the cloud-based system to:

output a health data response that includes information associated with the health check, wherein the information includes:
    an identifier of the first device,
    an identifier of the corresponding health checker of the plurality of health checkers,
    the hierarchical identifier of the first health data request,
    an identifier of the target device, and
    health data for the target device.

12. The one or more non-transitory computer readable medium of claim 11, wherein the instructions, when executed by the cloud-based system, further cause the cloud-based system to:

correlate the health data responses output by the plurality of health checkers with the first health data request, wherein a health data response received from the at least one of the plurality of health checkers after the second health data request has been received are not correlated with the first health data request.

13. The one or more non-transitory computer readable medium of claim 11,
wherein one of the plurality of health checkers provides health data to the first device, and
wherein another of the plurality of health checkers provides health data to another device different from the first device.

14. The one or more non-transitory computer readable medium of claim 10, wherein the instructions, when executed by the cloud-based system, further cause the cloud-based system to:

receive information regarding a new health checker communicatively connected to the network; and send, after having received the information regarding the new health checker, the second health data request to the plurality of health checkers and to the new health checker.

15. A health check system comprising:
a computing device comprising:
    one or more first processors; and
    a first memory storing first computer-readable instructions that, when executed by the one or more first processors, configure the one or more first processors to:
        receive a first health data request for performing a health check on a target device of a plurality of target devices communicatively connected to a network, wherein the first health data request includes a hierarchical identifier of the first health data request;
        output, onto the network, the received first health data request to each of a plurality of health checkers associated with the network, and communicatively connected to the network;
        receive, via the network, a health data response output by at least one of the plurality of health checkers that is capable of performing the requested health check on the target device;
        collect each health data response associated with the first health data request that is output by the at least one of the plurality of health checkers that is capable of performing the requested health check on the target device;
        output, to each of a plurality of health data collectors on the network, each health data response associated with the first health data request;
        receive, during the output of the health data responses associated with the first health data request, a second health data request for performing a health check on the target device, wherein the second health data request includes a hierarchical identifier of the second health data request;
the plurality of health checkers, each comprising:
    one or more second processors; and
    a second memory storing second computer-readable instructions that, when executed by the one or more second processors, configure the one or more second processors to:
        determine, based on receiving the first health data request, whether the corresponding health checker of the plurality of health checkers is capable of performing the requested health check on the target device;

performing, based on determining that the corresponding health checker of the plurality of health checkers is capable of performing the requested health check on the target device, the requested health check on the target device; and the plurality of health data collectors, each comprising:
one or more third processors; and
a third memory storing third computer-readable instructions that, when executed by the one or more third processors, configure the one or more third processors to:
for each health data response output after receipt of the second health data request, compare a hierarchical request identifier included in the corresponding health data response output to the hierarchical identifier of the second health data request;
in response to identifying that the corresponding health data response includes the hierarchical identifier of the first health data request, identify that the corresponding health data response is out of date; and
in response to identifying that the corresponding health data response includes the hierarchical identifier of the second health data request, identify that the corresponding health data response is current.

16. The health check system of claim 15, wherein the health data response comprises:
an identifier of a device that sent the first health data request to the computing device,
an identifier of the at least one of the plurality of health checkers,
the hierarchical identifier of the first health data request,
an identifier of the target device, and
health data for the target device.

17. The health check system of claim 16, wherein the first computer-readable instructions, when executed by the one or more first processors, further configure the one or more first processors to:
correlate the health data with the first health data request, wherein any health data received from the plurality of health checkers after the second health data request has been received are not correlated with the first health data request.

18. The health check system of claim 16,
wherein one of the plurality of health checkers provides health data to the device that sent the first health data request, and
wherein another of the plurality of health checkers provides health data to another different device.

19. The health check system of claim 15, wherein, the first computer-readable instructions, when executed by the one or more first processors, configure the one or more first processors to:
based on receiving information regarding a new health checker configured to act on received requests, send further health data requests to the plurality of health checkers and to the new health checker.

20. A method comprising:
receiving, via a network as output by a first device, a first health data request for performing a health check on a target device of a plurality of target devices communicatively connected to the network, wherein the first health data request includes a hierarchical identifier of the first health data request;
outputting, via the network, the first health data request to each of a plurality of health checkers associated with the network and communicatively connected to the network;
causing each health checker of the plurality of health checkers to, based on receiving the first health data request, determine whether the corresponding health checker of the plurality of health checkers is capable of performing the requested health check on the target device;
causing each health checker of the plurality of health checkers to, based on determining that the corresponding health checker of the plurality of health checkers is capable of performing the requested health check on the target device, perform the requested health check on the target device;
receiving a health data response output by at least one of the plurality of health checkers that is capable of performing the health check on the target device;
collecting each health data response associated with the first health data request that is output by the at least one of the plurality of health checkers that is capable of performing the health check on the target device;
outputting, via the network to each of a plurality of health data collectors, each health data response associated with the first health data request;
receiving, during the output of the health data responses associated with the first health data request, a second health data request for performing a health check on the target device, wherein the second health data request includes a hierarchical identifier of the second health data request;
for each health data response output after receipt of the second health data request, comparing a hierarchical request identifier included in the corresponding health data response output to the hierarchical identifier of the second health data request;
in response to identifying that the corresponding health data response includes the hierarchical identifier of the first health data request, identifying that the corresponding health data response is out of date; and
in response to identifying that the corresponding health data response includes the hierarchical identifier of the second health data request, identifying that the corresponding health data response is current.

* * * * *